(12) United States Patent
Stone (10) Patent No.: US 11,117,430 B2
(45) Date of Patent: Sep. 14, 2021

(54) INTERFACE SYSTEM OF A TRANSFER DUMP TRUCK

(71) Applicant: VOLVO TRUCK CORPORATION, Gothenburg (SE)

(72) Inventor: Jason Stone, Greensboro, NC (US)

(73) Assignee: VOLVO TRUCK CORPORATION, Gothenburg (SE)

( * ) Notice: Subject to any disclaimer, the term of this patent is extended or adjusted under 35 U.S.C. 154(b) by 308 days.

(21) Appl. No.: 16/417,808

(22) Filed: May 21, 2019

(65) Prior Publication Data

US 2020/0369102 A1 Nov. 26, 2020

(51) Int. Cl.
*B60D 1/36* (2006.01)
*B60T 7/20* (2006.01)

(52) U.S. Cl.
CPC .................. *B60D 1/36* (2013.01); *B60T 7/20* (2013.01); *B60T 2210/32* (2013.01); *B60Y 2200/145* (2013.01); *B60Y 2200/147* (2013.01)

(58) Field of Classification Search
CPC ... B60D 1/36; B60T 2201/08; B60T 2210/32; B60T 7/20; B60T 7/22; B60T 8/1708; B60Y 2200/145; B60Y 2200/147
See application file for complete search history.

(56) References Cited

U.S. PATENT DOCUMENTS 3,986,577 A    10/1976  Ebbesson et al.
4,253,680 A *   3/1981  Albright .................. B60D 1/36
                                                280/405.1
5,645,235 A *   7/1997  Witte ...................... B02C 18/14
                                                241/101.741
6,139,085 A *  10/2000  Templin .................. B60J 7/067
                                                296/100.13
6,336,683 B1 *  1/2002  Akiba ..................... B62D 59/04
                                                298/8 T
7,857,339 B2 * 12/2010  Paulson ................... B60T 7/22
                                                280/275

(Continued)

FOREIGN PATENT DOCUMENTS

DE    102012207648 A1   11/2013
GB         2177767 A     1/1987

*Primary Examiner* — Tyler J Lee
(74) *Attorney, Agent, or Firm* — Venable LLP; Jeffri A. Kaminski (57) ABSTRACT

A system includes a first object having a coupler to couple the first object to a second object; a first switch disposed on a first portion of the first object; a second switch disposed on a second portion on an exterior of the first object, and electrically and commutatively connected to the first switch to form an electric circuit, the second switch being arranged at a predetermined distance from the coupler; the second object disposed away from the first object and within a distance in relation to the second switch, the second object include a mating portion to couple with the coupler to connect the first object with the second object; and a third object disposed between the first object and the second object, and arranged at a corresponding predetermined distance from the mating portion to contact and close the second switch when the coupler and the mating portion are aligned for coupling the first object and the second object, and when the first object and the second object are moved together.

20 Claims, 4 Drawing Sheets

(56) References Cited

U.S. PATENT DOCUMENTS

| | | | | |
|---|---|---|---|---|
| 2002/0154004 A1* | 10/2002 | Meyer | ............... | B62D 53/0871 |
| | | | | 340/431 |
| 2008/0071453 A1* | 3/2008 | Nakanishi | ............... | B60T 10/02 |
| | | | | 701/70 |
| 2008/0245597 A1 | 10/2008 | Paulson | | |
| 2014/0303849 A1* | 10/2014 | Hafner | ................. | B60W 50/14 |
| | | | | 701/42 |
| 2015/0158527 A1* | 6/2015 | Hafner | ................. | B62D 15/027 |
| | | | | 701/41 |
| 2015/0203156 A1* | 7/2015 | Hafner | ................. | B62D 15/027 |
| | | | | 701/36 |
| 2019/0104085 A1* | 4/2019 | Smart | .................... | H04L 47/25 |

* cited by examiner

INTERFACE SYSTEM OF A TRANSFER DUMP TRUCK

BACKGROUND

1. Technical Field

The present disclosure relates to transfer dump truck technology, and more specifically to an interface system of a transfer dump truck.

2. Introduction

A transfer dump truck may refer to a dump truck having a first dump body which pulls a separate trailer having a second dump body. The second dump body can be transferred into the first dump body for dumping its load when the first dump body is empty. After the transfer, both the first and second dump bodies are raised together to dump the second dump body. The transfer of the second dump body into the emptied first dump body may be powered by an electric motor, a pneumatic motor or a hydraulic line.

There are various systems and approaches for facilitating connecting a dump truck with a trailer to transfer a second dump body into and out of the first dump body and onto the trailer. For example, an operator (e.g., a driver) may push a button located behind a dump truck while the dump truck is in reverse gear, such that the starter of the dump truck can be engaged and move the dump truck back in order to be able to visually align the trailer connection to pick up the trailer. However, such systems and approaches may pose dangers to the operator. For example, if the button is short closed, the dump truck may keep moving to injure the operator.

To mitigate the dangers posed to an operator, other example systems and approaches may involve a more complicated system which requires a more skilled driver and more expensive equipment. Thus, such systems and approaches may not be competitive.

Therefore, there is a need for safer and more cost-effective systems and approaches for connecting a dump truck with a trailer to transfer a second dump body into and out of a first dump body and onto the trailer.

SUMMARY

Embodiments of the present disclosure describe a system. The system includes a first object having a coupler to couple the first object to a second object; a first switch disposed on a first portion of the first object; a second switch disposed on a second portion on an exterior of the first object, and electrically and commutatively connected to the first switch to form an electric circuit, the second switch being arranged at a predetermined distance from the coupler; the second object disposed away from the first object and within a distance in relation to the second switch, the second object include a mating portion to couple with the coupler to connect the first object with the second object; and a third object disposed between the first object and the second object, and arranged at a corresponding predetermined distance from the mating portion to contact and close the second switch when the coupler and the mating portion are aligned, such as longitudinally, for coupling the first object and the second object, and when the first object and the second object are moved together.

The present disclosure also describes a transfer dump truck. The transfer dump truck includes a dump truck having a coupler to couple the dump truck to a trailer; a first switch disposed on a first portion of the dump truck; a second switch disposed on a second portion on an exterior of the dump truck, and electrically and commutatively connected to the first switch to form an electric circuit, the second switch being arranged at a predetermined distance from the coupler; the trailer disposed away from the dump truck and within a distance in relation to the second switch, the trailer including a mating portion to couple with the coupler to connect the dump truck with the trailer; and a bump plate disposed between the dump truck and the trailer, and arranged at a predetermined distance from the mating portion to contact and close the second switch when the coupler and the mating portion are aligned for coupling the dump truck and the trailer, and when the second switch is in contact with the bump plate to close the electric.

The present disclosure also describes a method of operating a transfer dump truck. The transfer dump truck includes a dump truck having a coupler to couple the dump truck to a trailer; a first switch disposed on a first portion of the dump truck; a second switch disposed on a second portion on an exterior of the dump truck, and electrically and commutatively connected to the first switch to form an electric circuit, the second switch being arranged at a predetermined distance from the coupler; the trailer disposed away from the dump truck and within a distance in relation to the second switch, the trailer including a mating portion to couple with the coupler to connect the dump truck with the trailer; and a bump plate disposed between the dump truck and the trailer, and arranged at a predetermined distance from the mating portion to contact the second switch when the coupler and the mating portion are aligned for coupling the dump truck and the trailer, and when the second switch is in contact with the bump plate to close the electric circuit. The method includes starting an engine of the dump truck, and keeping the engine running; activating the first switch; putting the dump truck in reverse and then let off a parking brake and a service brake of the dump truck; activating the second switch when the second switch contacts the bump plate; automatically applying the parking brake or the service brake to stop the dump truck when the second switch is activated; and connecting the dump truck with the trailer.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Embodiments of the present invention will be further described below with reference to the attached drawings.

DETAILED DESCRIPTION

The present disclosure describes a system and method for facilitating connecting a dump truck with a trailer to transfer a second dump body out of and onto the trailer for a transfer dump truck. The disclosed system and method may be applicable to various transfer dump trucks. In some non-limiting examples, the transfer dump truck may have an automatic or automated manual transmission, e.g., a Volvo I-shift or Mdrive transmission.

Figure 1:
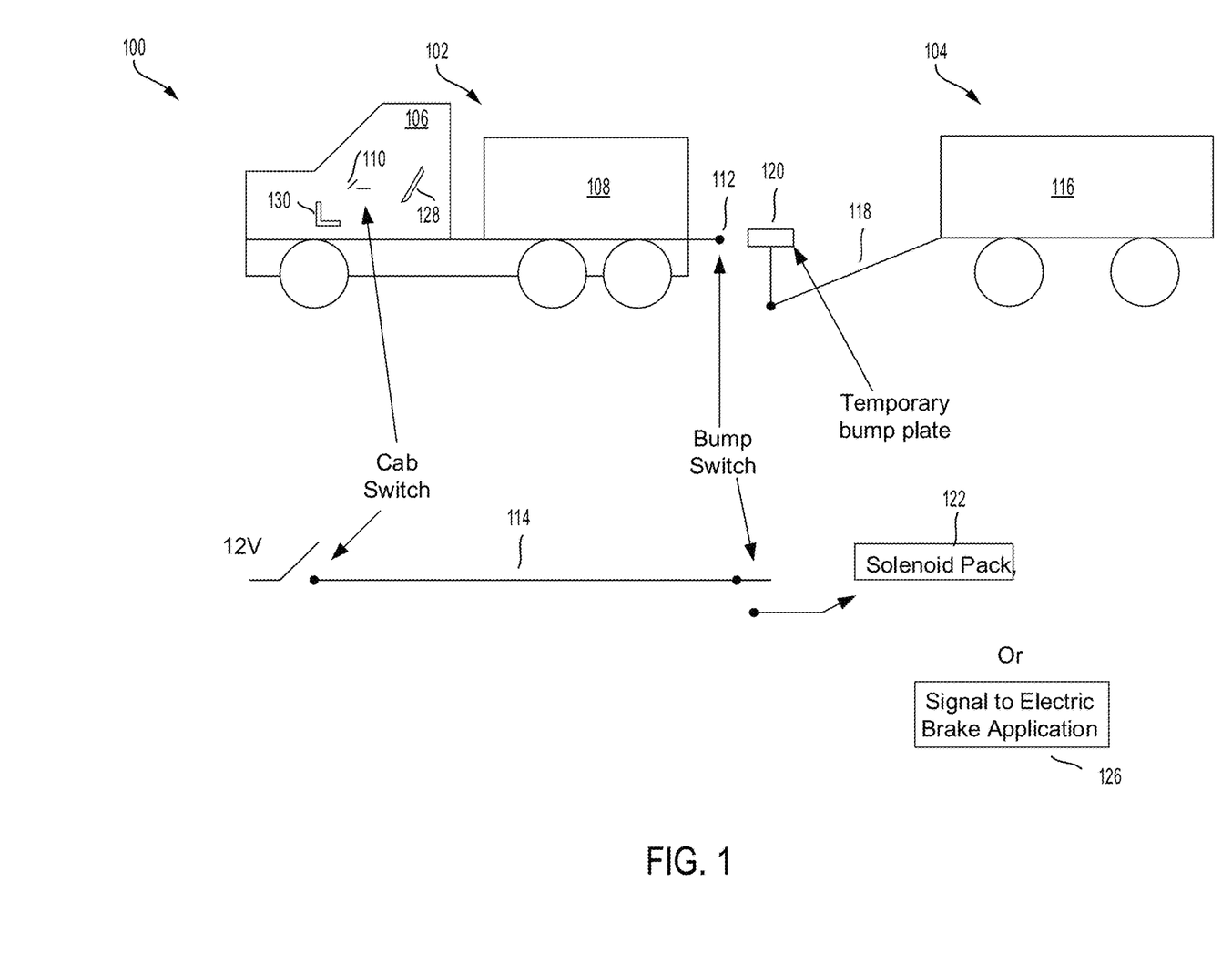
FIG. 1 illustrates an example transfer dump truck in which the disclosed system and method may be implemented, according to one embodiment.

FIG. 1 illustrates an example transfer dump truck 100 in which the disclosed system and method may be implemented, according to one embodiment. The transfer dump 100 may comprise a dump truck 102 and a trailer 104. The dump truck 102 may mechanically and electrically connect to the trailer 104 for pulling the trailer 104 or transferring a dump body between the dump truck 102 and the trailer 104.

The dump truck 102 may comprise a cab 106 and a first dump body 108. Inside the cab 106, a cab switch 110 may be disposed. The cab switch 110 may be at any location, for example on a dashboard of the cab 106. The cab switch 110 may also be disposed at any suitable position inside or outside of the cab 106, so long as a driver of the transfer dump truck 100 can access the cab switch 110.

The cab switch 110 may be any type of switch that can make or break an electrical circuit, for example an on/off switch. It may be operated manually. The cab switch 110 may comprise a resistor, an electrical coil, a conductor, a capacitor, and/or a transistor.

Inside the cab 106, a parking brake 128 and a service brake 130 may also be disposed to stop the dump truck 102 when desired. The parking brake 128 and the service brake 130 may be any suitable brake that is used and known in the industry.

The first dump body 108 may be any suitable dump body for transporting loose materials, such as sand, gravel, or soil. For example, the first dump body 108 may be hinged at the rear and equipped with hydraulic rams to lift the front, allowing the loaded material to be dumped.

The dump truck 102 may be provided with a bump switch 112. The bump switch 112 may be positioned at a rear portion of the dump truck 102. The bump switch 112 may be electrically connected, via an electrical connector 114, to the cab switch 110. The bump switch 112 may be any type of switch that can make or break an electrical circuit, for example an on/off switch. It may be operated manually, by a moving object, or by some sensing element for pressure, temperature or flow. The bump switch 112 may comprise a resistor, an electrical coil, a conductor, and/or a transistor. The electrical connector 114 may comprise an electrical conductor wire and may further comprise other electrical components such as a resistor, a coil, a capacitor, and/or a transistor.

The dump truck 102 may be provided with a coupling device, such as a coupler, for connecting the dump truck 102 to the trailer 104. The coupling device may be positioned at a rear portion of the dump truck 102. The coupling device may be electrically and mechanically fixed to the rear portion of the dump truck 102.

Figure 2:
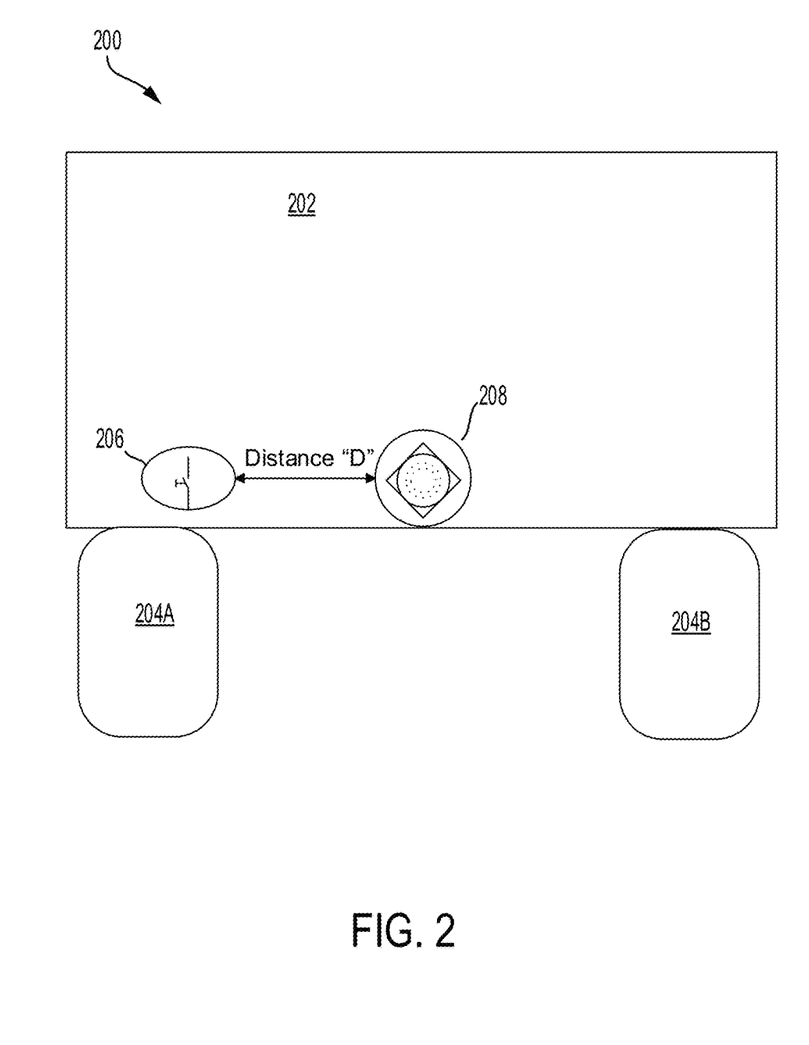
FIG. 2 illustrates a rear view of an example dump truck, according to one embodiment.

As shown in FIG. 2, a rear view 200 of an example dump truck 202 is illustrated. In addition to wheels 204A and 204B, a bump switch 206 is electrically and mechanically connected to the rear portion of the example dump truck 202. A coupler 208 is also electrically and mechanically connected to the rear portion of the example dump truck 202. The coupler 208 may be disposed with a distance D from the bump switch 206, such that the bump switch 206 and the coupler 208 may not interfere with each other. The coupler 208 may be any type of coupler to connect the trailer to the truck, such as a hook receiver or a ball and hitch. In some other examples, the coupler 208 may be configured to be an universal joint that comprises a pair of hinges located close together, oriented at 90° to each other, connected by a cross shaft. Further, the coupler 208 may also be configured to a link-and-pin coupler.

Now referring back to FIG. 1, the trailer 104 may be any suitable trailer. A second dump body 116 may be situated and secured on the trailer 104. The second dump body 116 may be any suitable dump body for transporting loose materials, such as sand, gravel, or soil. The second dump body 116 may be configured to have dimensions (e.g., length, width, and depth or height) smaller than dimensions of the first dump body 108, such that the second dump body 116 may be transferred into and situated inside the first dump body 108 when the first dump body 108 is emptied. Once the second dump body 116 with its load is transferred into the first dump body 108, the second dump body 116 may be secured to the first dump body 108. Both the first dump body 108 and the second dump body 116 may be raised together, for example via the hydraulic rams of the first dump body 108, to dump the load of the second dump body 116.

The trailer 104 may be mechanically, electrically and removably connected to the dump truck 102, such that the second dump body 116 may be transferred from and back to the trailer 104. The trailer 104 may be equipped with transfer mechanism such as rails to facilitate the transfer of the second dump body 116 securely.

A connection mechanism 118 may be used to connect the dump truck 102 with the trailer 104. The connection mechanism 118 may comprise a strait bar, a hydraulic or pneumatic component, a hook, a male or female coupler, etc. to securely connect the trailer 104 to the dump truck 102.

The trailer 104 may be provided with a bump plate 120 for facilitating safely aligning the trailer 104 with the dump truck 102 prior to connecting the trailer 104 with the dump truck 102. The bump plate 120 may further facilitate safely stopping the dump truck 102 prior to connecting the trailer 104 with the dump truck 102. Herein the disclosed system may comprise the cab switch 110, the bump switch 112, the electrical connector 114, and the bump plate 120.

When it is desired to connect the trailer 104 with the dump truck 102 for transferring the second dump body 116 out of or into the trailer 104, the dump truck 102 may be required to move closer to and align with the trailer 104 for the connection. The driver may remain inside the cab 106, and activate the cab switch 110. For example, the driver may push or turn the cab switch 110 to an ON position of the cab switch 110, such that the cab switch 110 and the bump switch 112 are electrically connected to a power source, such as a battery of 12V.

The driver may put the transmission of the dump truck 102 in reverse and drive the dump truck 102 backwards while the driver is in the cab 106. When the bump switch 112 is in contact with the bump plate 120 to form a closed circuit, the dump truck 102 can be automatically stopped by either the parking brake 128 or the service brake 130 at the right place. The driver may then manually connect the trailer 104 with the dump truck 102 via the connection mechanism 118. After finishing the connection, the driver may enter the cab 106 and turn the cab switch 110 off, to drive off the transfer dump truck 100. The driver may also operate to transfer the second dump body 116 into the first dump body 108.

The disclosed system may further comprise a camera or other sensors that may facilitate aligning the trailer 104 with the dump truck 102. The camera or other sensors may be positioned in the rear portion of the dump truck 102, such as on a rear portion of the first dump body 108 facing the trailer 104.

When the bump switch 112 hits the bump plate 120, the bump switch 112 can be closed. The electrical circuit comprising the cab switch 110 and the bump switch 112 is completed. The completed circuit may actuate for example, the parking brake 128 of the dump truck 102, to automatically stop the dump truck 102. The dump truck 102 is stopped with the parking brake 128 applied while the driver is in the cab 106. Thus it is safe for the driver to connect the trailer 104 with the dump truck 102. Because the parking brake 128 is automatically applied when the bump switch 112 hits the bump plate 120, the driver would not have to know how close the dump truck 102 is to the trailer 104.

In some embodiments, the parking brake 128 may be a pneumatically controlled parking brake, for example, an air parking brake. The air parking brake may comprise a disc or drum arrangement which is designed to be held in an applied position by spring pressure. Air pressure may be produced to release these "spring brake" parking brakes. In such cases, the bump switch 112 may automatically apply the parking brake by activating an air solenoid valve 122. The air solenoid valve 122 may further activate an air pressure valve and a rear service relay valve to release air pressure for automatically applying the parking brake.

In some embodiments, the parking brake 128 may be an electric parking brake. An electric parking brake may have a switch with electric actuators on the rear wheels or the front wheels of the dump truck 102. For example, the electric parking brake may be of "cable-pulling" type, which may comprise an electric motor simply that pulls the parking brake cable on the push or pull of a button rather than a mechanical pedal or handle in the cabin. A more complex electric parking brake may employ a computer-controlled motor attached to each of the two rear brake calipers. In such cases, the completed circuit may activate an electric braking request (a signal to electric brake application 126) to the system, for example, the vehicle electronic control unit (VECU). The VECU may process the signal to apply the electric parking brake.

In some embodiments, the completion of the circuit may actuate the service brake 130 instead of the parking brake 128. Herein the service brake 130 may refer to a system that is designed to slow down the dump truck 102 and bring it to a stop. For example, the service brake 130 may be activated every time the brake pedal is pressed. If the service brake 130 is a pneumatically-controlled service brake, such as an air service brake, closing the bump switch 112 and the cab switch 110 may actuate compressed air pressing on a piston to apply the air pressure to the brake pad needed to stop the dump truck 102. If the service brake 130 is an electric service brake, an electric braking request (e.g., a signal to electric brake application 126) may be generated and sent to the system, for example, the vehicle electronic control unit (VECU). The VECU may process the signal to apply the electric service brake.

Once the circuit is completed and the parking brake 128 or the service brake 130 is activated, a parking or service switch (e.g., disposed next to or on the parking brake 128 or the service brake 130 respectively in the cab 106) for the parking or service brake may be activated to have the parking or service brake engaged. When necessary, the driver may release the parking or service brake by pushing the parking or service switch back in.

The bump plate 120 may be in any suitable form or fashion. The bump plate 120 may be temporarily, permanently, or removably situated or attached to, for example, the connection mechanism 118 of the trailer 104, such that the bump switch 112 may be depressed when the dump truck 102 is stopped at the proper location when the dump truck 102 is properly aligned with the trailer 104 to make the connection to the trailer 104.

In some embodiments, the bump plate 120 may be a portion of the trailer 104, for example, a front portion of the trailer 104. In such cases, the bump switch 112 may be positioned at a remote end of a horizontal extension of the dump truck 102. The length of the horizontal extension may be significantly same as the length of the connection mechanism 118.

The bump plate 120 may be configured to be wider than the bump switch 112 to ensure the bump switch 112 can properly contact the bump plate 120, even though the dump truck 102 may not be exactly aligned with the trailer 104. The connection mechanism 118 may be configured to be able to swing around at an angle, for example, within a certain radius. As such, the driver may be able to drop the connection mechanism 118 into the hitch in a case the dump truck 102 may not be exactly aligned with the trailer 104.

Figure 3:
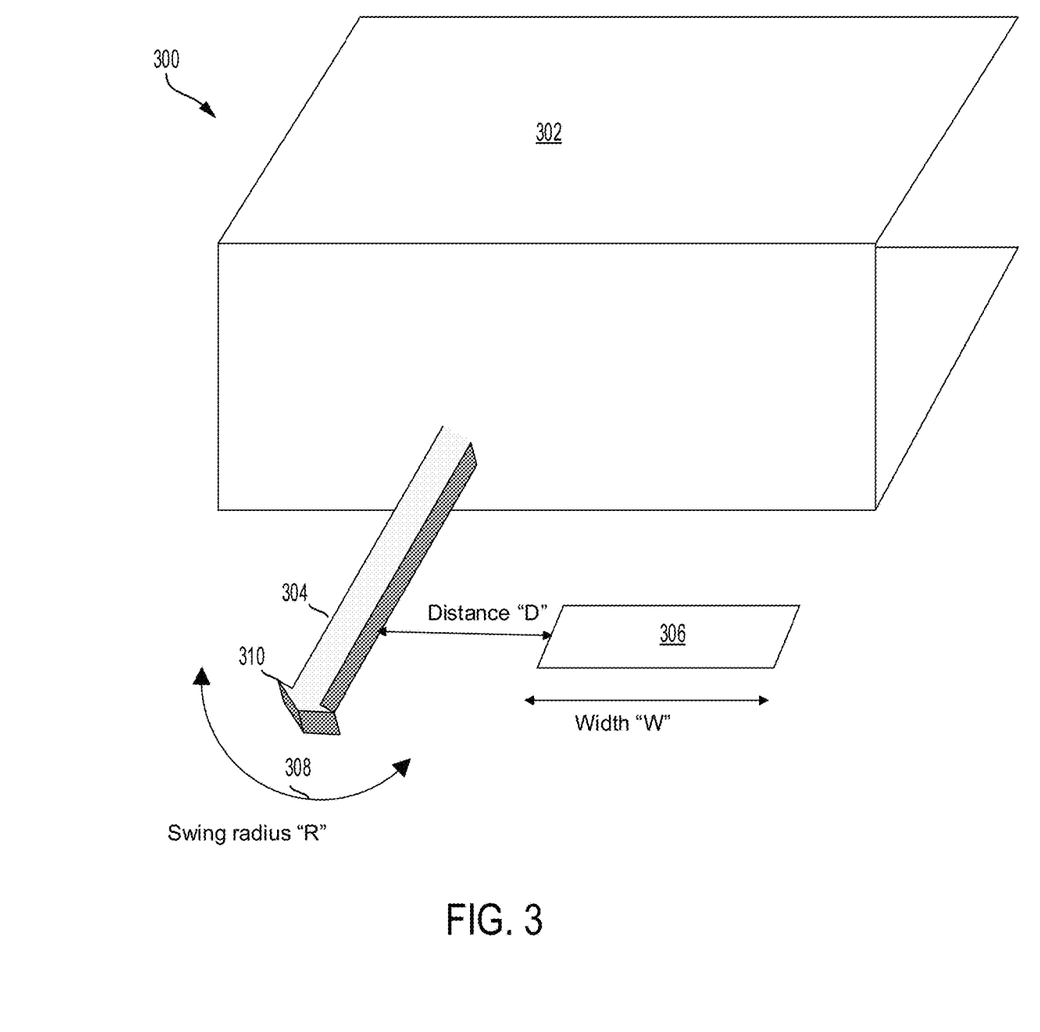
FIG. 3 illustrates a front perspective view of an example trailer, according to one embodiment.

For example, as shown in FIG. 3, a front perspective view 300 of an example trailer 302 is illustrated. The example trailer 302 may be provided with a connection mechanism 304 for connecting the trailer 302 to the dump truck. The connection mechanism 304 may be configured to have a mating portion 310 at a distant end of the connection mechanism 304 from the example trailer 302, such that the mating portion can couple to the coupler of the dump truck. The mating portion 310 may be a female or male mating portion. The connection mechanism 304 may further be configured to have a swing radius R as indicated by a double head arrow 308, within which the connection mechanism 304 can move. A bump plate 306 may be provided to have a width W. The bump plate 306 may be disposed with the distance D (a corresponding distance D between the bump switch and the coupler of the dump truck) from the connection mechanism 304, such that when the bump switch and the bump plate contact, the coupler of the dump truck and the connection mechanism of the trailer can align properly to allow coupling within the swing radius R and the distance D. The width W may or may not be proportional to the swing radius R such that the bump switch 112 contacts the bump plate 120 when the mating portion 310 is within the swing radius R of the connection mechanism 118.

Now referring back to FIG. 1, the bump plate 120 may be a tri-pod which may be arranged next to the connection mechanism 118, or be over top of the connection mechanism 118. The tri-pod may be easy to line-up with the trailer 104 and the bump switch 112. The tri-pod may be easily stored and carried by the trailer 104. The tri-pod may also be stored on the dump truck 102 until needed.

In another embodiment, the bump plate 120 may be a permanent part of the connection mechanism 118, the trailer 104 itself, or be a temporary set-up (e.g., temporarily attached to the connection mechanism 118). The bump plate 120 may be configured to be at a proper position to exert enough force to activate the bump switch 112 when the bump switch 112 contacts the bump plate 120.

In another embodiment, the bump plate 120 may be configured to accommodate when the dump truck 102 may overrun and it takes time for the brakes to actually stop the dump truck 102. The bump plate 120 may be configured not to bend or damage the connection mechanism 118 when the bump switch 112 contacts the bump plate 120. For example, the bump plate 120 may be configured to have some spring ability to absorb the impact from the bump switch 112, such that the bump plate 120 may tolerate the impact without breaking or permanently deforming. In similar ways, the bump switch 112 may be configured to have some spring ability to absorb the impact from the bump plate 120, such that the bump switch 112 may tolerate the impact without breaking or permanently deforming.

In some embodiment, the coupler 208 may be a hitch provided at the rear portion of the dump truck 102 for connecting with the connection mechanism 118. The bump switch 112 may be positioned at the same height level as the hitch. The bump plate 120 may then be configured to have the same height level as the hitch, such that the bump switch 112 can contact properly with the bump plate 120.

Although the above description is provided with respect to a transfer dump truck 100, the disclosed system may be equally applied to other systems. For example, the dump truck and the trailer may be generally referred to as a first object and a second object, respectively. The first object may be configured to have a coupler (e.g., the hitch provided in a rear portion of the dump truck 102) to couple the first object to the second object (e.g., via the connection mechanism 118).

A first switch (e.g., the cab switch 110) may be provided to be disposed on a first portion (e.g., the cab 106) of the first object. A second switch (e.g., the bump switch 112) may be provided to be disposed on a second portion on an exterior of the first object, for example, a rear portion of the dump truck 102. The second switch may be electrically and commutatively connected to the first switch to form an electric circuit (e.g., via the electrical connector 114). The second switch may be arranged at a predetermined distance from the coupler, for example, with 2 feet from the hitch.

The second object may be disposed away from the first object and within a distance in relation to the second switch. For example, the trailer 104 may be parked away from the dump truck 102, and with a distance from the bump switch 112. The second object may include a mating portion (e.g., the connection mechanism 118) to couple with the coupler to connect the first object with the second object.

The disclosed system may further comprise a third object (e.g., the bump plate or bar 120) disposed between the first object and the second object, and arranged at a predetermined distance from the mating portion to contact the second switch when the coupler and the mating portion are longitudinally aligned for coupling the first object and the second object, when the second switch is in contact with the third object to close the electric circuit.

Figure 4:
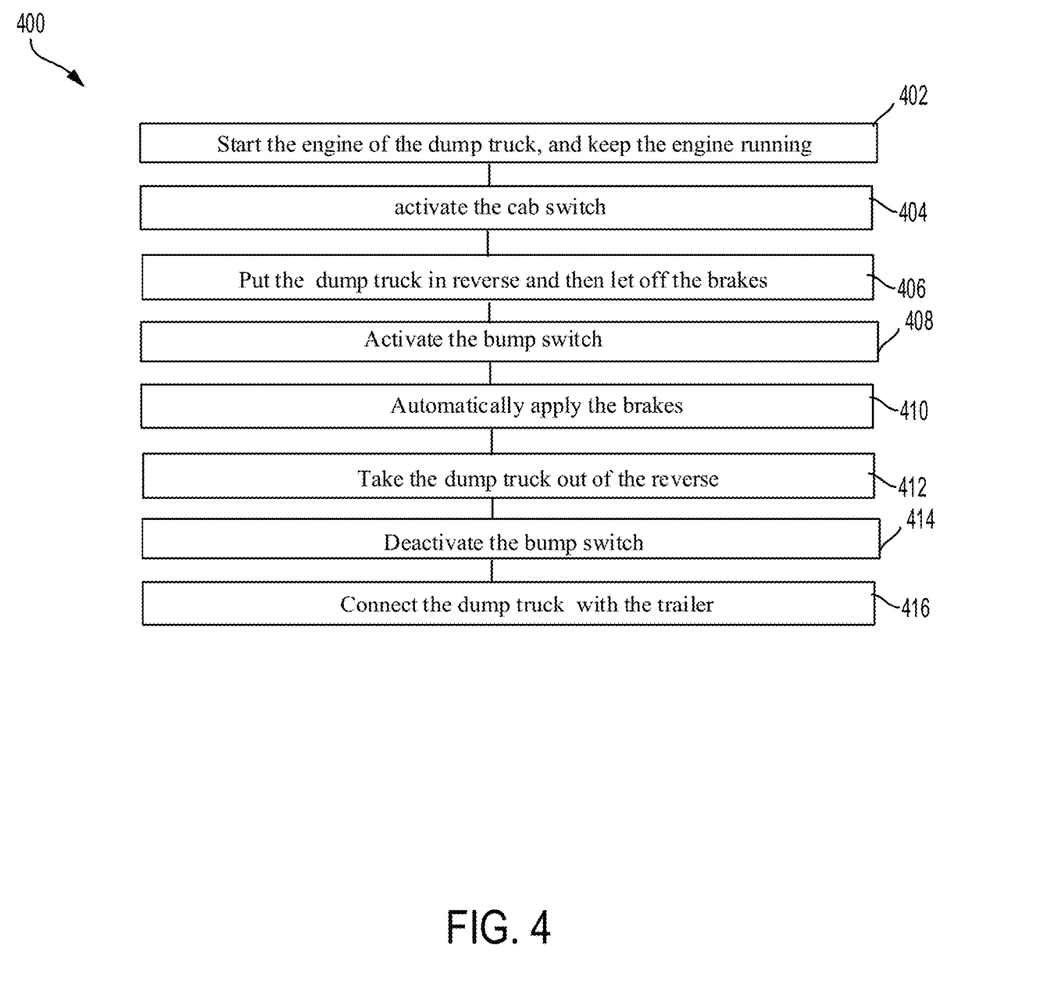
FIG. 4 illustrates an example method of operating the disclosed system for facilitating connecting a trailer to a dump truck of a transfer dump truck.

FIG. 4 illustrates an example method 400 of operating the disclosed system for facilitating connecting a trailer to a dump truck of a transfer dump truck. The method 400 may be implemented in the transfer dump truck 100, and comprise the following steps. Although the method 400 is described with respect to a transfer dump truck, the method 400 may be equally applied to other systems.

At step 402, a driver may enter the cab of the dump truck, start the engine of the dump truck, and keep the engine running.

At step 404, the cab switch is activated. The driver may enable the cab switch by for example, pushing in the cab switch, such that the cab switch is electrically connected to the bump switch.

At step 406, the driver may put the dump truck in reverse and then let off the brakes (the parking brake and the service brake), which can start the dump truck rolling backwards toward the trailer.

At step 408, the bump switch is activated. When the bump switch hits the bump plate, the circuit is closed as described above.

At step 410, the brakes are applied. As described the above, the bump switch can activate an air solenoid valve directly which applies the service brake or parking brake. The bump switch can also activate an electric braking request to the system, for example, the VECU for applying the service brake or parking brake by the system. As such, the dump truck may stop at the proper position as the proper time.

At step 412, the driver may then take the dump truck out of reverse, so the dump truck may not push against the brakes. When the dump truck is stopped automatically, the driver may take the dump truck out of reverse and manually return the transmission gear to a neutral position. The driver may also apply the parking brake manually if not automatically applied or latched. The driver may also shut the engine off.

At step 414, the bump switch may be deactivated. When the bump switch hits the bump plate, the bump switch may pop to close the electric circuit to have the parking or service brake applied automatically to stop the dump truck. After the dump truck is stopped, the driver may deactivate the bump switch, for example, by disabling the cab switch to break the electric circuit. In some embodiments, the bump switch may be automatically deactivated when the bump switch no longer contacts the bump plate.

At step 416, the dump truck is connected with the trailer. The driver may get out of the dump truck and connect the trailer with the dump truck as described above. The driver may also remove the bump plate.

After completing the connection between the trailer and the dump truck, the driver may go back in the cab. The driver may then start the engine, and then release the parking or service brake to drive off.

The various embodiments described above are provided by way of illustration only and should not be construed to limit the scope of the disclosure. For example, the various steps can be omitted, reordered or combined. Various modifications and changes may be made to the principles described herein without following the example embodiments and applications illustrated and described herein, and without departing from the spirit and scope of the disclosure.

I claim:

1. A system, comprising:
a first object having a coupler to couple the first object to a second object;
a first switch disposed on a first portion of the first object;
a second switch disposed on a second portion on an exterior of the first object, and electrically and commutatively connected to the first switch to form an electric circuit, the second switch being arranged at a predetermined distance from the coupler;
the second object disposed away from the first object and within a distance in relation to the second switch, the second object include a mating portion to couple with the coupler to connect the first object with the second object; and
a third object disposed between the first object and the second object, and arranged at a corresponding predetermined distance from the mating portion to contact and close the second switch when the coupler and the mating portion are aligned for coupling the first object and the second object, and when the first object and the second object are moved together.

2. The system of claim 1, wherein:
the first object is a dump truck;
the second object is a trailer; and
the dump truck and the trailer form a transfer dump truck.

3. The system of claim 2, wherein:
the mating portion has a swing radius;
the third object has a width, whereby the second switch contacts the third object when the mating portion is within the swing radius and the coupler aligns with the mating portion to allow coupling of the first object and the second object.

4. The system of claim 1, wherein:
the first object is a dump truck;
the dump truck comprises an electric brake; and
an electric signal is sent to apply the electric brake to stop the dump truck when the electric circuit is closed.

5. The system of claim 1, wherein:
the first object is a dump truck;
the dump truck comprises a pneumatically-controlled brake; and
a pneumatic system of the dump truck is activated to apply the electrically and/or pneumatically-controlled brake to stop the dump truck when the electric circuit is closed.

6. The system of claim 1, wherein:
the first switch is a cab switch;
the first object is a dump truck; and
the first portion of the first object is a dashboard in a cab of the dump truck.

7. The system of claim 1, wherein:
the second switch is a bump switch;
the first object is a dump truck; and
the second portion is an exterior rear portion of the dump truck.

8. The system of claim 1, wherein:
the third object is a bump plate; and
the bump plate is removably attached to the second object.

9. The system of claim 1, wherein:
the third object is a bump plate; and
the bump plate is fixed to the second object.

10. A transfer dump truck, comprising:
a dump truck having a coupler to couple the dump truck to a trailer;
a first switch disposed on a first portion of the dump truck;
a second switch disposed on a second portion on an exterior of the dump truck, and electrically and commutatively connected to the first switch to form an electric circuit, the second switch being arranged at a predetermined distance from the coupler;
the trailer disposed away from the dump truck and within a distance in relation to the second switch, the trailer including a mating portion to couple with the coupler to connect the dump truck with the trailer; and
a bump plate disposed between the dump truck and the trailer, and arranged at a predetermined distance from the mating portion to contact and close the second switch when the coupler and the mating portion are aligned for coupling the dump truck and the trailer, and when the second switch is in contact with the bump plate to close the electric circuit.

11. The transfer dump truck of claim 10, wherein:
the dump truck comprise a first dump body;
the trailer comprises a second dump body; and
dimensions of the first dump body is greater than dimensions of the second dump body such that the second dump body can be transferred into the first dump body when the first dump body is emptied.

12. The transfer dump truck of claim 10, wherein:
the dump truck comprises a brake; and
the closed electric circuit sends an electric signal to stop the dump truck via the brake.

13. The transfer dump truck of claim 10, wherein:
the dump truck comprises a brake; and
the closed electric circuit activates a pneumatic or electric system to stop the dump truck via the brake.

14. The transfer dump truck of claim 10, wherein:
the first portion of the dump truck is a dashboard in a cab of the dump truck.

15. The transfer dump truck of claim 10, wherein:
the second portion is an exterior rear portion of the dump truck.

16. The transfer dump truck of claim 10, wherein:
the bump plate is removably attached to the trailer.

17. The transfer dump truck of claim 10, wherein:
the bump plate is fixed to the trailer.

18. A method of operating a transfer dump truck, the transfer dump truck comprises a dump truck having a coupler to couple the dump truck to a trailer; a first switch disposed on a first portion of the dump truck; a second switch disposed on a second portion on an exterior of the dump truck, and electrically and commutatively connected to the first switch to form an electric circuit, the second switch being arranged at a predetermined distance from the coupler; the trailer disposed away from the dump truck and within a distance in relation to the second switch, the trailer including a mating portion to couple with the coupler to connect the dump truck with the trailer; and a bump plate disposed between the dump truck and the trailer, and arranged at a predetermined distance from the mating portion to contact the second switch when the coupler and the mating portion are aligned for coupling the dump truck and the trailer, and when the second switch is in contact with the bump plate to close the electric circuit, the method comprising:
starting an engine of the dump truck, and keeping the engine running;
activating the first switch;
putting the dump truck in reverse and then let off a parking brake and a service brake of the dump truck;
activating the second switch when the second switch contacts the bump plate;
automatically applying the parking brake or the service brake to stop the dump truck when the second switch is activated; and
connecting the dump truck with the trailer.

19. The method of claim 18, further comprising:
deactivating the second switch after the dump truck is stopped.

20. The method of claim 18, further comprising:
deactivating the first switch after connecting the trailer and the dump truck.

* * * * *